Nov. 13, 1956  P. P. DEMAY  2,770,442
CONTROL APPARATUS
Filed Feb. 16, 1953

INVENTOR.
PETER P. DEMAY
BY
George H. Fisher
ATTORNEY

United States Patent Office 2,770,442
Patented Nov. 13, 1956

2,770,442

CONTROL APPARATUS

Peter P. Demay, Chicago, Ill., assignor to Minneapolis-Honeywell Regulator Company, Minneapolis, Minn., a corporation of Delaware Application February 16, 1953, Serial No. 337,025

6 Claims. (Cl. 251—61)

The present invention relates to improved pneumatic motors especially suitable as valve actuators.

While the pneumatically operated valve motors now used are inter-changeable to some extent, they must ordinarily be calibrated in place, such as on a valve. Further, the assembly of the existing motors on the valves is difficult enough that it is properly a factory operation. In addition, a servicing operation in the field involving a removal of the motor requires very careful disassembly and assembly or a field calibration of the device.

The present actuator is complete in itself and thus can be factory calibrated without it being assembled on a valve. Further, the present actuator can be quickly and accurately fitted to a valve and then, if it is required to remove the motor, the motor can be replaced without further adjustment or calibration.

It is thus an object of this invention to provide an improved pneumatic motor especially suitable as a valve actuator.

Further, it is an additional object to provide an actuator and a valve coacting in a new and improved manner.

It is an additional object to provide a quickly detachable connection between a pneumatic motor and a valve stem, the connection being readily operable without special tools.

It is another object to provide a pneumatic actuator that can be assembled and adjusted as a self contained unit.

These and other objects will be readily apparent upon a study of the following specification and drawing wherein.

Figure 1:
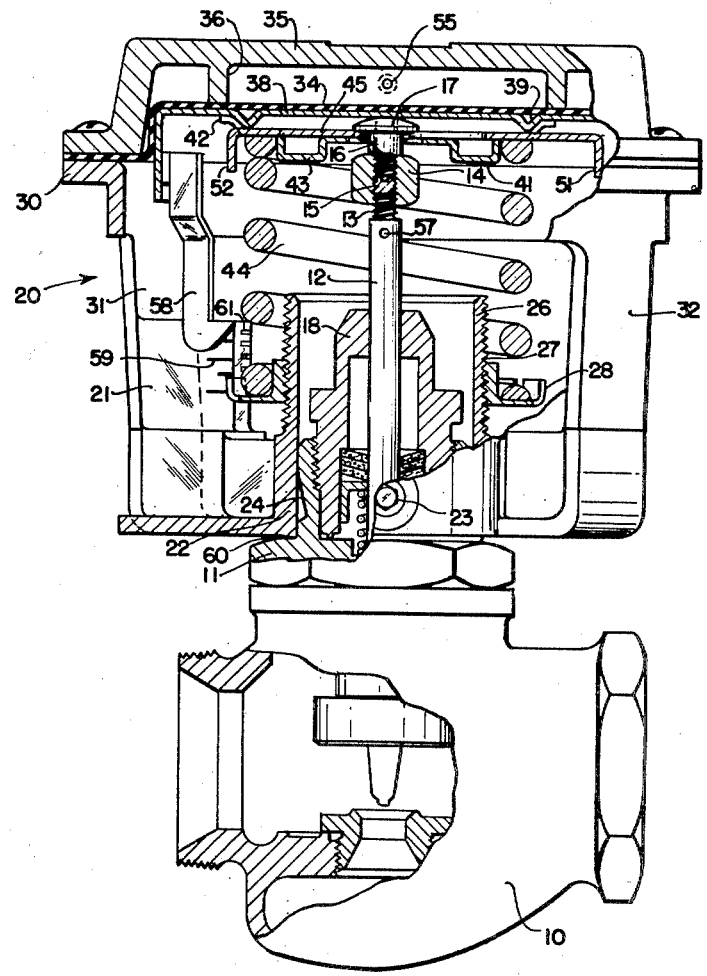
Figure 1 is an elevational view of the present valve and actuator, with parts being broken away and parts in section.

In Figure 1, valve body 10 includes an upwardly extending bonnet 11 through which extends valve stem 12, the upper end of valve stem 12 being threaded as at 13. A hollow threaded collar 14 having a tightly fitting adjustable stop member 15 is screwed down tightly on the end 13 of valve stem 12 until stopped by 15, collar 14 also having a neck portion 16 and an enlarged head 17.

Suitable packing is provided for valve stem 12 in bonnet 11, this packing preferably being removable in the manner disclosed in the copending application of Richard C. Mott, Serial No. 252,963, filed October 24, 1951. As in the Mott application, the packing is held in place by a removable packing nut 18.

Actuator 20 is supported on and concentric with bonnet 11, the actuator including a body portion 21 having a central attaching portion 22 held in place by Allen head set screws, or the like such as 23, coacting with an annular inclined groove 24 in the bonnet 11. The central attaching portion 22 of the body also has an upwardly extending portion 26 threaded on its outer side as at 27, with this threaded portion having adjustable there-along a spring support means 28.

Figure 2:
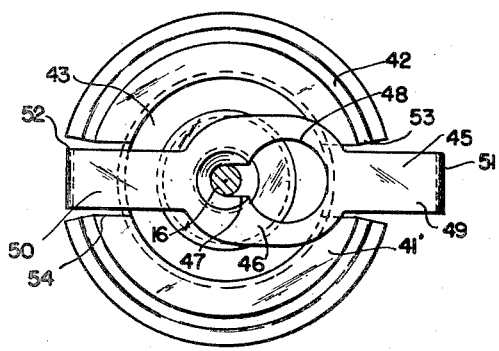
Figure 2 is a plan view on the latch member and spring retaining and guiding member.

Body 21 also includes an upper diaphragm supporting portion 30 concentric with valve stem 12 and the central supporting portion 22, this diaphragm supporting portion 30 being joined to the supporting portion 22 by arms 31 and 32. A flexible diaphragm 34, preferably of a heat resisting rubber-like material, is disposed on supporting portion 30 and clamped in place by an upper chamber forming cap member 35, member 35 being attached to member 30 and diaphragm 34 being clamped therebetween. An annular rib 36 is provided in cap member 35 to serve as an upper limit stop for diaphragm 34. A downwardly facing shallow cup-like member 38 is arranged on the lower side of diaphragm 34 to serve as a reinforcing member therefor, this cup-like reinforcing member lending stiffness to the diaphragm along its pressure exerting face. Reinforcing member 38 is provided with a downwardly extending annular rib 39 which serves to stiffen the member 38 and also provides a guiding means for the spring retainer means 41. The retainer means 41 has an upwardly extending angularly disposed flange portion 42 coacting with the annular guide rib 39 to thus center member 41 and also has an annular downwardly depending rib 43 serving to stiffen member 41 and to provide a guide for the upper end of compression spring 44. The annular, inclined surface 42 of member 41 is so proportioned that the inner portions of member 41 are spaced from reinforcing member 38 sufficiently to receive the head portion 17 of member 16 and also a latch member 45. Latch member 45 has a widened central portion 46 with a keyhole slot therein, the keyhole slot having a narrow portion 47 and an enlarged portion 48, the portion 48 being large enough to permit head 17 to pass therethrough. Latch member 45 also includes arms 49 and 50 extending from the central portion 46, these arms being terminated by downwardly extending actuating portions 51 and 52, respectively. To permit movement of latch member 45 when the actuator is assembled, slots 53 and 54 are cut in member 41 along a diameter thereof, these slots extending from the outer edge inwardly past the outer rim of reinforcing rib 43, the inner portion of member 41 being disposed on a plane substantially level with the lower portion of the slots. As shown in Figure 2, latch member 45 is in a retaining position and must be shifted to the left to a point where the enlarged portion 48 is concentric with head 17 to permit release thereof. Because of the slightly convex under side of head 17 and the dimpling of slider 45 around the portion 47 of the slot, both the head and the slide 45 tend to be restrained in the position shown.

An air connection socket 55 is provided in cap 35 for connection to suitable pneumatic control apparatus.

Operation

With the valve assembled as shown in Figure 1, it is operated by varying the pressure in the chamber formed by member 35, the connection being made through socket 55. As the air pressure is increased in the chamber, diaphragm 34, plate 38, member 41, head 17 and the valve stem 12 are all forced downwardly against spring 44, the position of the valve stem being a function of the balance of forces exerted by the spring 44 and the pressure applied to the diaphragm 34, the valve position being indicated by member 58 coacting with indicia 59. Likewise, with the pressure relieved in the chamber, spring 44 is able to force the diaphragm to its uppermost position, as shown.

If it should now be determined that the motor should be removed from the valve for some reason or other, such as for inspecting the packing in the valve, a suitable tool such as a screwdriver blade is inserted between the portion 30 of the actuator and depending portion 51 of the latch member 45 which is then forced to the left until enlarged portion 48 registers with head 17. Then, the Allen head clamping screws, such as 23, are loosened, the air connection is removed and the motor 20 can then be slipped off the valve without further difficulty. To remove the packing, collar 14 must also be removed from threaded portion 13 of the valve stem, the stem being held against turning by a suitable tool inserted in hole 57, and then portion 18 is screwed out of bonnet 11 leaving the packing readily accessible.

Assuming that the packing either needed no attention or was replaced, the re-assembly of the valve is merely the reverse of the operation described. After nut 18 is replaced, the collar 14 is threaded back on portion 13 of the stem until stopped by 15; the motor 20 is slipped back down on the bonnet 11 and screws 23 are tightened. Thereafter, a screwdriver or the like is inserted between portion 30 and depending portion 52 of member 45 and portion 52 is forced to the right sufficiently for the narrowed portion 47 of member 45 to engage head 17 and thereby latch member 41 to the valve stem. With the air connection being restored, the valve is again ready for operation. Because the lock screw or stop 15 in collar 14 is relatively immovable, collar 14 is readily adjusted back on stem 12 to the exact position it was in when removed so that no difficulty is had in positioning head 17 relative to the valve stem.

To calibrate the motor, either in the field or in the factory, upon its first assembly, the motor is adjusted to start at a predetermined pressure by adjusting spring support means 28 along the threaded portion 27 of member 26, starting position being determined by a support 28 coacting with indicia 61 on one of the arms such as on the edge of 31. With the starting pressure of the motor properly adjusted, it can be readily fitted to a valve by first determining the distance from the underside of plate 38 to the bottom portion of the attachment member 22 of the valve motor and then adjusting the distance from the top edge or support portion 60 of bonnet 11 to the top of the head 17 of the valve stem, when the valve stem is in its uppermost working position, to the same distance as the aforementioned dimension between member 38 and member 22 of the motor. When these distances correspond, then the motor is readily fitted on the valve and no further adjustment is necessary after the valve and motor are combined.

While only the preferred embodiment of the present invention has been specifically disclosed, it is obvious that many substitutions and equivalents will be apparent to one skilled in this art, hence the scope of this invention should be determined only by the appended claims.

I claim:

1. In a pneumatically operated valve, a valve body including an upstanding bonnet, a valve stem extending through said bonnet, the upper end of said stem being threaded, a tapped hollow collar having an adjustable stop therein screwed into the end of said stem, a threaded member having an enlarged head on the upper end of said tapped hollow collar, an actuator having a body portion, said body portion including a central attaching portion attached to said bonnet, said attaching portion being threaded and having a spring support means adjustable along said threaded portion, said body portion having an upper diaphragm attaching portion, a flexible diaphragm extending over said diaphragm attaching portion, a chamber forming cap member arranged over said diaphragm and attached to said diaphragm attaching portion in a manner to clamp said diaphragm therebetween, an air connection into the chamber formed by said cap member and said flexible diaphragm, a reinforcing member arranged on the lower side of said diaphragm, a spring retaining member abutting said reinforcing member, a slideable latch member having a portion engageable with said head portion and having a depending operating portion, said latch member being arranged between said spring retaining member and said reinforcing member, and compression spring means arranged between said spring retaining member and said spring support means.

2. In a pneumatically operated valve, a valve body including an upstanding bonnet, a valve stem extending through said bonnet, the upper end of said stem being threaded, a tapped hollow collar screwed onto the end of said stem, an enlarged head member attached to said collar, an actuator having a body portion, said body portion including a central attaching portion attached to said bonnet, said attaching portion being threaded and having a spring support means adjustable along said threaded portion, said body portion having an upper diaphragm supporting portion, a flexible diaphragm extending over said diaphragm supporting portion, a chamber forming cap member arranged over said diaphragm and attached to said diaphragm supporting portion in a manner to clamp said diaphragm therebetween, an air connection into the chamber formed by said cap member and said flexible diaphragm, a spring retaining member coacting with said flexible diaphragm, a slideable latch member having a portion engageable with said head member and also coacting with said spring retaining member, and compression spring means arranged between said spring retaining member and said spring support means.

3. In an actuator adapted to be attached to a valve stem, a motor chamber having a movable wall, a rigid reinforcing member abutting said movable wall, a spring retaining member having means spacing said latter member from said wall and having diametrically extending slots therein, a latch member slidable along said spring retainer member and having portions movable along said slots and having an aperture adapted to retain a valve stem, and spring means arranged to hold said spring retaining member, said latch member and the reinforcing member in assembled relation.

4. In a valve construction: a valve having a body with an operating stem extending therefrom; an actuator; means connecting said actuator to said valve body, said actuator comprising: a lower support; a movable member having a means of motivating power connected thereto; a retaining member engaging said movable member; resilient means compressed between said lower support and said retaining member so that upon movement of said movable member downward said means of motivating power overcomes the force of said resilient means, said retaining member having a diametrical slot, and a slideable latch member, said latch member being mounted in said slot and having means for engaging said stem when in a selected position whereby said actuator is connected in an operating manner to said valve.

5. In a valve, a valve body having an operating member extending therefrom; an actuator; means connecting said actuator to said body, said actuator comprising: a movable member backed by a motivating means; a retaining member associated with said movable member; and a spring for applying an upward load on said retaining member, said retaining member having a diametrical recess therein for receiving a slideable latching member, said latching member having means for engaging said operating member when in a first position and upon movement of said latching member to a second position through said recess it disconnects said operating member and said retaining member to allow for removal of said actuator from said valve body without disturbing the loading of said retaining member.

6. In a valve construction, a valve including a reciprocable stem, an actuator including a movable member engaging said stem, a stem retaining member having a slot partially across the same, at least a portion of said retaining member aligned with said slot having means spacing said portion from said movable member, a slideable member disposed in the space between said movable member and said portion of said retaining member and aligned with and slidable in said slot, and means for detachably connecting said slideable member to said stem upon sliding said latter member in one direction.

References Cited in the file of this patent

UNITED STATES PATENTS

| | | | |
|---|---|---|---|
| 972,434 | Blomberg | Oct. 11, | 1910 |
| 1,300,717 | Fulton | Apr. 15, | 1919 |
| 1,388,137 | Willey | Aug. 16, | 1921 |
| 2,318,161 | Johnson | May 4, | 1943 |
| 2,647,538 | Demay | Aug. 4, | 1953 |